Patented Apr. 4, 1939

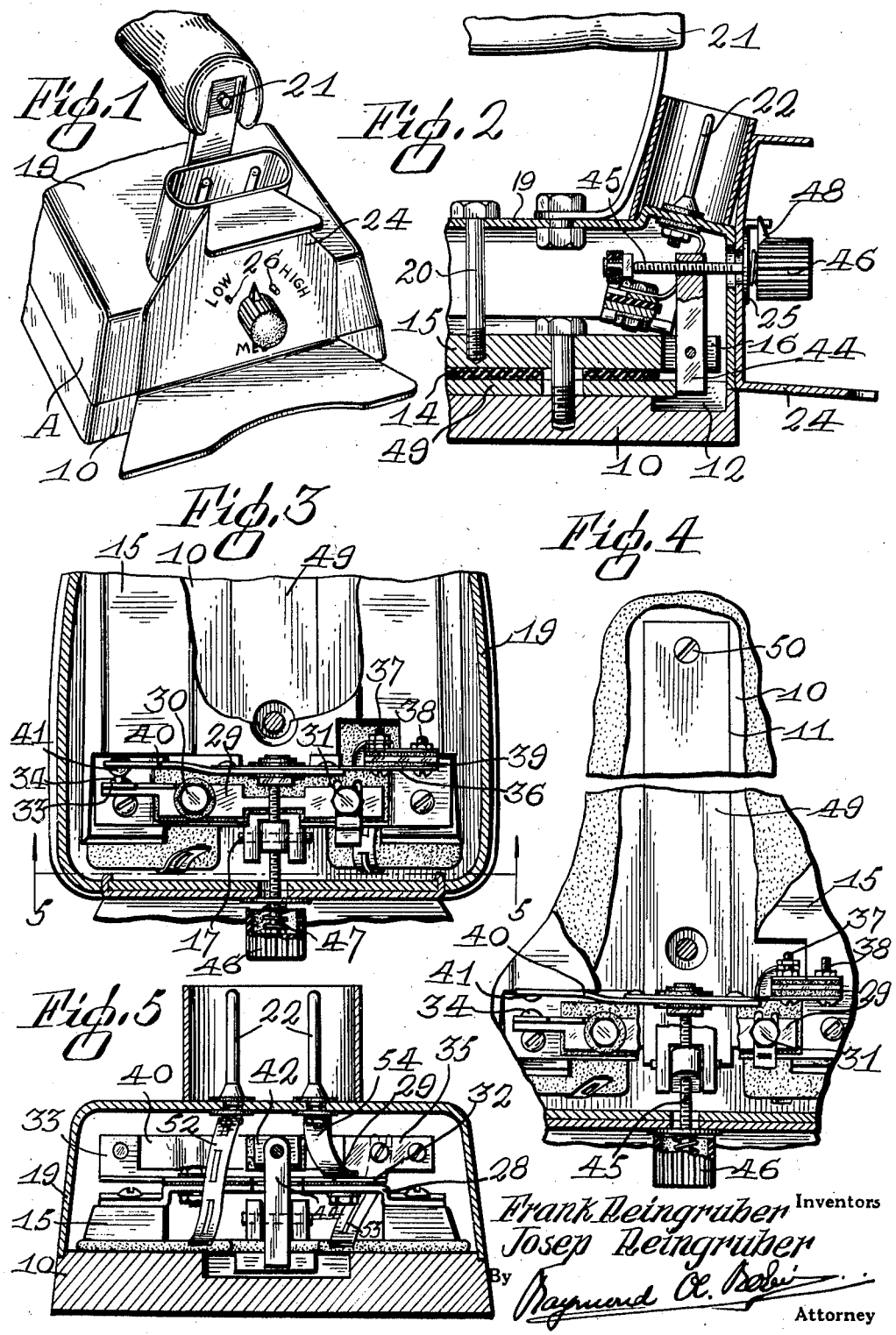

2,153,503

UNITED STATES PATENT OFFICE 2,153,503

SWITCH FOR ELECTRIC IRONS

Frank Reingruber and Josep Reingruber, Toronto, Ontario, Canada, assignors to General Thermostat Corporation, New York, N. Y., a corporation of New York Application June 3, 1935, Serial No. 24,687
In Canada October 17, 1934

8 Claims. (Cl. 200—137)

The present invention relates to improvements in electric switches, and has particular reference to thermostatically operated switch mechanisms adapted for use on electric irons and the like.

An object of the invention is the provision of switch mechanism for automatically opening and closing an electric control switch at predetermined temperatures.

Another object of the invention is the provision of a thermostatically operable switch which is positive in action and which will enable accurate maintenance of selected temperatures.

A further object of the invention is the provision of an automatic switch for electric irons operable by a thermostatic device in contact with and responsive to temperature variations of the sole plate.

Still another object of the invention is the provision of an electric switch automatically operable by a thermostatic element disposed so that expansion causes straight longitudinal distortion thereof.

A still further object of the invention is the provision of a thermostatically operable switch having means for selectively regulating the maximum working temperature.

Still another object of the invention is the provision of a thermostatically operated switch mechanism which is relatively simple and durable in construction.

Other objects and advantages of the invention will become apparent as the description progresses.

In the accompanying drawing forming a part of this specification and in which like reference characters are employed to designate corresponding parts throughout the same:

Figure 1 is a fragmentary perspective view of the rear end portion of an electric iron, Figure 2 is a vertical longitudinal section through the same, Figure 3 is a horizontal longitudinal section through the same, Figure 4 is a section similar to Figure 3 showing parts thereof broken away, and Figure 5 is a vertical transverse section on line 5—5 of Figure 3.

Referring to the drawing, wherein for the purpose of illustration is shown a preferred embodiment of the invention, the letter A generally designates an electric iron essentially similar to types heretofore commonly used, said iron embodying a flat sole plate 10 formed with a longitudinally extending channel 11 in the top face. The channel 11, which is relatively wide and shallow, extends from a point short of the forward end of the plate rearwardly into an enlarged rear cavity 12.

On the top of the sole plate 10 is positioned a resistance heating element 14 held in position by a pressure plate 15 covering the same. At the central rear edge of the pressure plate 15 are formed a pair of longitudinally projecting pivot arms 16 supporting a transverse pivot pin 17.

A cover casing 19 is fitted on the sole plate 10 and firmly connected with the pressure plate through the medium of screws 20. On the upper rear end portion of the casing 19 are firmly secured a pair of parallel terminal pins 22 insulated from the cover and adapted for connection with a connector socket.

To the rear wall of the casing 19 is rigidly connected a U-shaped stand bracket 24 having an apertured bearing disc 25 securely connected to the outer face of the bracket body and having a plurality of pins 26 or other indicating means designated by characters such as: "High", "Low" and "Med.", indicating medium, on the outer face.

Upon the inner end portion of the pressure plate 15 is secured an elongated transversely extending bridge bar 28 supporting on its upper face an elongated conductor bar 29 rigidly fastened to the bridge bar by screws 30 and 31 and insulated from the bridge bar by means of a strip of insulating material 32, such as mica. At one end of the bridge bar 29 is formed an upstanding lip 33 having a contact point 34 secured to the inner face.

To a bent upturned flange 35 formed at one end of the bridge bar 28 is securely fastened a spring steel arm 36 attached to the flange by screws 37 and 38 and insulated from the flange by insulating strips 39. A rigid conducting bar 40 is secured to the spring arm forming an extension of the arm and carrying a contact point 41 at the free end. The contact 41 is normally urged into contacting engagement with the complementary point 34 by the resilient action of the supporting arm 36. At the central portion, the arm and bar assembly carries a thrust plate 42 riveted to the assembled elements and insulated therefrom.

A lever 44 supported in approximately vertical position intermediate its ends on the pivot pin 17 provides means for actuating the resiliently mounted contact carrying arm 36. As shown to advantage at Figure 2, the lever is supported on the pivot so that the distance from the pivot centre to the upper end of the lever is substantially greater than the lower part, that is, the distance from the pivot to the bottom end of the lever. In the upper part of the lever 44 is adjustably fitted a regulating screw 45 assuming an approximately horizontal position. One end of the screw 45 projects inwardly and is adapted to bear against the thrust plate 42 during automatic switch opening operation. The opposite end of the screw 45 projects through and is slidably fitted in a hole in the bearing disc 25 and has a cupped knob 46 secured at the outer extremity. A coil spring 47 is disposed about the outer part of the screw and is held under compression between the end wall of the knob 46 and the disc 25, tending to swing the screw 45 and the upper end of the lever to a retracted switch closing position.

At the inner edge of the knob is formed a radial index 48 adapted to enable selective adjustment of the regulating screw in correspondence with the temperature indicating scale characters on the bracket 24.

A thermostatic operating device 49 embodies a flat elongated bar formed of temperature responsive material having a relatively high coefficient of expansion, such as brass. This bar is fitted quite snugly in the channel 11 in the sole plate and disposed so that the top side is approximately flush with the upper face of the sole plate. The inner end of the thermostat bar is firmly secured in the channel by an anchor screw 50 extending through a screw hole in the bar and threaded into the sole plate. The outer end portion of the bar extends beyond the channel and projects into the enlarged cavity 12 in the rear end of the sole plate and is disposed in horizontal alignment with the lower end portion of the lever 44.

One terminal of the heating element 14 is connected by a conductor 52 to one of the terminal pins 22. The opposite terminal of the heater is connected by a conductor 53 to the binding screw 37 making electric connection with the resilient contact supporting arm 36. A conductor 54 connects the complementary terminal pin 22 with the conducting bar 29 through the medium of the screw 31. Thus, one terminal connection to the heating element is completed, when the switch is closed, through the terminal conductor 54, the bar 29, the switch contacts 34 and 41, the resilient arm 36, screw 37 and conductor 53. Separation of the switch contacts 34 and 41 will obviously break the circuit and cut-off the current to the heating element.

The switch mechanism operates as follows:

When a plug or suitable electric connector is fitted on the terminal pins 22 to heat the iron, the gradually increasing temperature of the resistance and the sole plate heated thereby will cause straight longitudinal expansion of the thermostat bar 49 so that the free rear end portion will be extended rearwardly. Inasmuch as the rear end of the thermostat bar moves in a path intercepting the lower portion of the lever 44, the bar will engage and swing the lever until the iron has been heated to a predetermined temperature, determined by the setting of the knob 46, at which time the inner end of the screw 45 will bear against the thrust plate and swing the contact carrying arm inwardly to disconnect the switch contacts, as shown at Figure 4. Thus, the electric circuit to the heating element is automatically broken until the temperature of the iron decreases to a sufficient degree allowing retraction of the thermostatic bar and closure of the automatic switch. It will be noted that the coil spring 47 functions to exert a substantial pull upon the regulating screw 45, tending to pull the screw away from the movable switch arm and to tightly press the lower end of the lever 44 against the end edge of the thermostat bar. This will insure accurate and reliable operation of the mechanism at all times.

This construction affords a compact, efficient and accurately operable switch operating structure. The use of a flat longitudinally expanding thermostatic device enables mounting thereof in such manner as to obtain a most advantageous thermal relation with the iron while the lever mechanism will insure positive and efficient actuation of the movable switch contact.

It is to be understood that the form of our invention herein shown and described is to be taken as a preferred example of the same and that various changes as to the shape, size and arrangement of parts may be resorted to without departing from the spirit of the invention or the scope of the subjoined claims.

Having thus described our invention, we claim:

1. In an automatic temperature control mechanism, a fixed switch contact, a transversely mounted spring arm rigidly secured to a support member at one end and having a switch contact on the free end disposed for engagement with the said fixed contact, the said arm being disposed to yieldingly retain the contact on the end thereof in engagement with the fixed contact, a lever pivotally supported in a vertical position, a screw extended transversely through the lever adjacent its upper end and engageable with the intermediate portion of the spring arm to disengage the contacts, the said screw being selectively adjustable on the lever, a longitudinally expansible thermostatic bar arranged at approximately right angle to the lever and adapted to engage the lower end portion thereof to swing the lever and effect temperature responsive operation of the spring contact arm, and a spring connected with the screw on the lever so as to yieldingly force the lower end thereof against the end of the thermostatic bar.

2. In an automatic temperature control mechanism a fixed switch contact, a spring arm rigidly supported at one end and having a movable switch contact on the free end engageable with the fixed contact, the said arm being disposed to yieldingly retain the movable contact in engagement with the fixed contact, a pivotally supported lever, an element mounted in and extending transversely of the lever at one end engageable with the spring arm to disengage the contacts, the said arm engaging element being readily accessible for selective adjustment on the lever to change the temperature setting of the contact mechanism, and a thermostatic bar adapted to engage the opposite end of the lever to operatively swing the same.

3. In an automatic temperature control mechanism a fixed switch contact, a spring arm rigidly supported at one end and having a movable switch contact on the free end engageable with the fixed contact, the said arm being disposed to yieldingly retain the movable contact in engagement with the fixed contact, a pivotally supported lever, an element mounted on and extending transversely of the lever at one end engageable with the spring arm to disengage the contacts, the said arm engaging element being readily accessible for selective adjustment of its position on the lever, and a longitudinally expansible thermostatic bar adapted to engage the opposite end of the lever to swing the same and effect temperature responsive operation of the movable switch contact.

4. In an automatic temperature control mechanism, a fixed switch contact, a spring arm rigidly supported at one end and having a movable switch contact on the free end engageable with the fixed contact, the said arm being disposed to yieldingly retain the movable contact in engagement with the fixed contact, a pivotally supported lever, an element extending transversely of the lever at one end engageable with the spring arm to disengage the contacts, the said arm engaging element being selectively adjustable on the lever, a longitudinally expansible thermostatic bar adapted to engage the opposite end of the lever to swing the same and effect temperature responsive operation of the movable switch contact, and independent spring means operable to yieldingly force one end of the lever tightly against the thermostatic bar.

5. In an automatic temperature control mechanism, a fixed switch contact, a spring arm rigidly supported at one end and having a movable switch contact on the free end engageable with the fixed contact, the said arm being disposed to yieldingly retain the movable contact in engagement with the fixed contact, a pivotally supported lever, an element extending transversely of the lever at one end engageable with the spring arm to disengage the contacts, the said arm engaging element being selectively adjustable on the lever, a longitudinally expansible thermostatic bar adapted to engage the opposite end of the lever to swing the same and effect temperature responsive operation of the movable switch contact, and a spring connected with the transverse element on the lever adapted to yieldingly force one end of the lever tightly against the thermostatic bar.

6. In an automatic temperature control mechanism, a fixed switch contact, a spring arm supported at one end and having a movable switch contact on the free end engageable with the fixed contact, the said arm being disposed to yieldingly retain the movable contact in engagement with the fixed contact, a pivotally supported lever, a thermally expansible and contractible bar supporting said lever for pivotal movement, an element mounted on and extending transversely of the lever at one end engageable with the spring arm to disengage the contact, said arm engaging element being selectively adjustable on the lever to change the temperature setting of the control mechanism, and a second thermally responsive bar adapted to engage the opposite end of the lever to operatively swing the same.

7. In an automatic temperature control mechanism a fixed switch contact, a spring arm rigidly supported at one end and having a movable switch contact on the free end engageable with the fixed contact, the said arm being disposed to yieldingly retain the movable contact in engagement with the fixed contact, a pivotally supported lever, a metallic thermally expansible and contractible plate supporting said lever for pivotal movement, an element mounted on and extending transversely of the lever at one end engageable with the spring arm to disengage the contacts, the said arm engaging element being readily accessible for selective adjustment of its position on the lever, and a longitudinally expansible and contractible thermostatic bar adapted to engage the opposite end of the lever to swing the same and effect temperature responsive operation of the movable switch contact.

8. In an automatic temperature control mechanism a fixed switch contact, a spring arm supported at one end and having a movable switch contact on the free end engageable with the fixed contact, the said arm being disposed to yieldingly retain the movable contact in engagement with the fixed contact, a pivotally supported lever, a screw element mounted in said lever engageable with the spring arm to disengage the contacts, the screw element being adjusted on the lever, a thermostatic bar adapted to engage the opposite end of the lever to operatively swing the same, and said screw element having a cup-shaped knob, an abutment opposite said knob and a spring in said knob bearing on said abutment so as to yieldingly force one end of the lever against said thermostatic bar.

FRANK REINGRUBER.
JOSEP REINGRUBER.